(12) United States Patent
Hammer et al.

(10) Patent No.: US 9,050,690 B2
(45) Date of Patent: *Jun. 9, 2015

(54) COMPONENT CONNECTION AND/OR METHOD FOR CONNECTING COMPONENTS

(71) Applicant: Bayerische Motoren Werke Aktiengesellschaft, Munich (DE)

(72) Inventors: Maik Hammer, Eching (DE); Johann van Niekerk, Munich (DE); Thomas Herzinger, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/656,139

(22) Filed: Oct. 19, 2012

(65) Prior Publication Data

US 2013/0036594 A1 Feb. 14, 2013

Related U.S. Application Data

(63) Continuation of application No. PCT/EP2011/000865, filed on Feb. 23, 2011.

(30) Foreign Application Priority Data

Apr. 28, 2010 (DE) .......................... 10 2010 028 322
Apr. 28, 2010 (DE) .......................... 10 2010 028 323

(51) Int. Cl.
*G05G 1/12* (2006.01)
*B23K 37/04* (2006.01)
(Continued)

(52) U.S. Cl.
CPC ........... *B23K 37/04* (2013.01); *Y10T 403/7064* (2015.01); *Y10T 29/49826* (2015.01);
(Continued)

(58) Field of Classification Search
USPC ......... 403/114, 245, 252, 254, 266, 291, 360, 403/361, 373, 374.1, 408.1; 219/117.1, 219/121.14, 121.64, 137 R; 228/135, 136, 228/212, 213; 29/446, 450, 453, 525, 29/525.02; 24/289, 293, 294, 295, 453, 24/458, 581.11; 296/29
See application file for complete search history.

(56) References Cited

U.S. PATENT DOCUMENTS 2,275,900 A * 3/1942 Hall ................................ 52/511
3,338,293 A * 8/1967 Hohmann ................ 160/370.21
(Continued)

FOREIGN PATENT DOCUMENTS

DE 33 02 177 A1 8/1983
DE 34 14 845 A1 6/1985
(Continued)

OTHER PUBLICATIONS

German-language Japanese Office Action dated Nov. 4, 2014 (four (4) pages).
(Continued)

*Primary Examiner* — Michael P Ferguson
*Assistant Examiner* — Nahid Amiri
(74) *Attorney, Agent, or Firm* — Crowell & Moring LLP

(57) ABSTRACT

A component connection is provided and includes, a first vehicle component, which has a male fixing element that projects from the first vehicle component and that partially or completely has the shape of a sphere or completely or partially has a sphere-like shape, and a second vehicle component, which has a female fixing element that is intended to receive the male fixing element. The male fixing element is inserted into the female fixing element in an insertion direction. The male fixing element has an excessive dimension relative to the female fixing element substantially perpendicularly to the insertion direction so that the two vehicle components are detachably clamped together at the fixing elements.

18 Claims, 2 Drawing Sheets

(51) Int. Cl.
- *B23K 26/24* (2014.01)
- *B23K 26/30* (2014.01)
- *F16B 5/06* (2006.01)
- *F16B 5/08* (2006.01)
- *F16B 21/07* (2006.01)

(52) U.S. Cl.
CPC ........ *Y10T403/7062* (2015.01); *Y10T 403/471* (2015.01); *B23K 26/246* (2013.01); *B23K 26/421* (2013.01); *B23K 2201/006* (2013.01); *F16B 5/0642* (2013.01); *F16B 5/08* (2013.01); *F16B 21/073* (2013.01)

(56) References Cited

U.S. PATENT DOCUMENTS

| | | | |
|---|---|---|---|
| 3,696,442 A | | 10/1972 | Amundsen et al. |
| 4,438,971 A | * | 3/1984 | Zaydel et al. ............ 296/191 |
| 4,637,116 A | | 1/1987 | Paerisch et al. |
| 4,942,539 A | | 7/1990 | McGee et al. |
| 5,013,175 A | * | 5/1991 | Hayden ..................... 403/24 |
| 5,150,623 A | | 9/1992 | Woods |
| 5,441,095 A | | 8/1995 | Trethewey |
| 5,580,204 A | * | 12/1996 | Hultman ................... 411/509 |
| 5,727,300 A | | 3/1998 | Ekdahl et al. |
| 5,755,526 A | * | 5/1998 | Stanevich ................. 403/122 |
| 6,129,411 A | | 10/2000 | Neff et al. |
| 6,209,175 B1 | * | 4/2001 | Gershenson ................. 24/297 |
| 6,405,983 B1 | * | 6/2002 | Goj ......................... 248/205.1 |
| 6,670,573 B2 | * | 12/2003 | Klein et al. ............. 219/121.64 |
| 6,857,809 B2 | * | 2/2005 | Granata ..................... 403/121 |
| 7,354,217 B2 | * | 4/2008 | Soder ....................... 403/374.5 |
| 8,064,686 B2 | | 11/2011 | Wagner et al. |
| 2003/0090682 A1 | | 5/2003 | Gooch et al. |
| 2004/0104599 A1 | | 6/2004 | Svendsen et al. |
| 2007/0079491 A1 | | 4/2007 | Hader |
| 2008/0210672 A1 | | 9/2008 | Meyer et al. |
| 2009/0070983 A1 | | 3/2009 | Stumpf et al. |
| 2009/0194650 A1 | * | 8/2009 | Corvo et al. ............. 248/205.3 |
| 2011/0173797 A1 | | 7/2011 | Van Niekerk et al. |

FOREIGN PATENT DOCUMENTS

| | | |
|---|---|---|
| DE | 197 39 350 A1 | 3/1999 |
| DE | 197 41 062 A1 | 4/1999 |
| DE | 197 45 728 A1 | 4/1999 |
| DE | 199 29 057 A1 | 12/2000 |
| DE | 698 00 282 T2 | 3/2001 |
| DE | 202 05 694 U1 | 8/2002 |
| DE | 696 32 309 T2 | 9/2004 |
| DE | 102 50 392 B4 | 12/2004 |
| DE | 10 2004 046 584 A1 | 5/2005 |
| DE | 602 20 252 T2 | 1/2008 |
| DE | 10 2007 044 635 A1 | 4/2009 |
| DE | 10 2007 061 803 B3 | 6/2009 |
| DE | 10 2008 038 747 A1 | 2/2010 |
| DE | 10 2009 049 602 B3 | 7/2011 |
| DE | 10 2010 028 322 A1 | 11/2011 |
| DE | 10 2010 028 323 A1 | 11/2011 |
| DE | 10 2010 040 547 A1 | 3/2012 |
| EP | 1 772 199 A1 | 4/2007 |
| EP | 2 154 054 A1 | 2/2010 |
| FR | 2 761 626 A1 | 10/1998 |
| JP | 64-55900 A | 3/1989 |
| JP | 61-115718 A | 6/1989 |
| JP | 5-54809 A | 3/1993 |

OTHER PUBLICATIONS

Partial English translation of Chinese Office Action dated Nov. 27, 2014 (two (2) pages).
English translation of Chinese Office Action dated Jul. 15, 2014 (Nine (9) pages).
International Search Report for PCT International Application PCT/EP2011/000865 filed on Feb. 23, 2011 of which the present application is a continuation thereof including English translation.
German Office Action dated Aug. 3, 2010 including English-language translation (Eight (8) pages).
International Search Report for PCT/EP2010/004746 (U.S. Appl. No. 13/074,881) including English-language translation (Four (4) pages).
German Office Action dated Aug. 8, 2011 with English translation (ten (10) pages).
International Search Report PCT/EP2011/004561 (U.S. Appl. No. 13/678,030) including English translation (Four (4) pages).

* cited by examiner

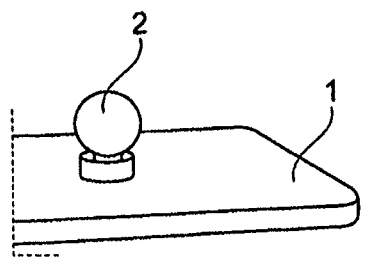
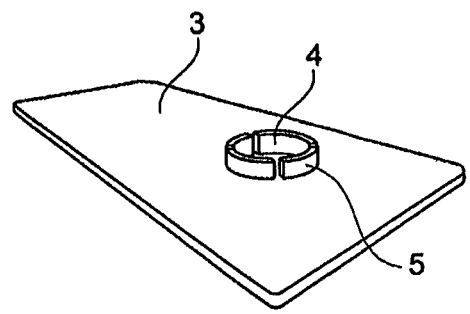
Fig. 1   Fig. 2
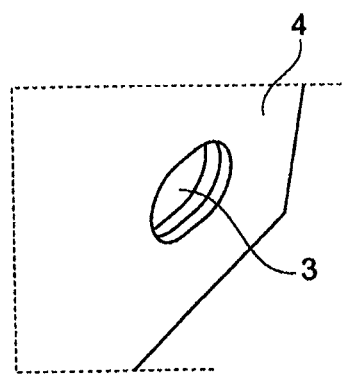
Fig. 3
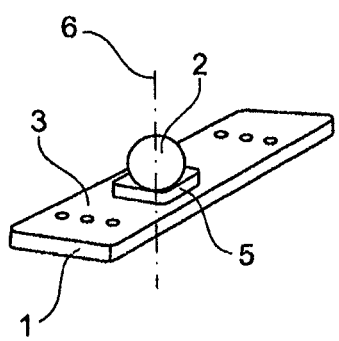
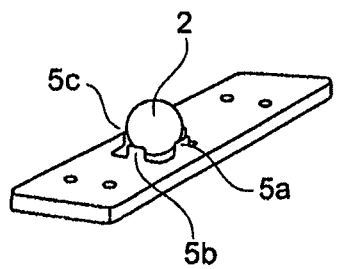
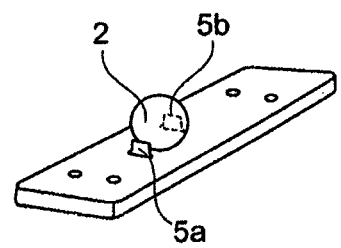
Fig. 4   Fig. 5   Fig. 6

COMPONENT CONNECTION AND/OR METHOD FOR CONNECTING COMPONENTS

CROSS REFERENCE TO RELATED APPLICATIONS

This application is a continuation of PCT International Application No. PCT/EP2011/000865, filed Feb. 23, 2011, which claims priority under 35 U.S.C. §119 from German Patent Application Nos. 10 2010 028 322.3, filed Apr. 28, 2010 and 10 2010 028 323.1, filed Apr. 28, 2010, the entire disclosures of which are herein expressly incorporated by reference.

This application contains subject matter related to U.S. application Ser. No. 13/678,030, filed on Nov. 15, 2012, entitled "Method for Connecting Two Vehicle Components and/or Two Non-Vehicle Components".

BACKGROUND AND SUMMARY OF THE INVENTION

The present invention relates to a component connection a first vehicle component having a male fixing element protruding from the first vehicle component which has partially or completely the shape of a sphere or has partially or completely a shape similar to a sphere, and a second vehicle component having a female fixing element provided for receiving the male fixing element, the male fixing element being inserted into the female fixing element in one direction of insertion. The present invention also relates to a method for detachably preassembling at least two vehicle components.

A component connection of the above-mentioned type is known from German patent application DE 10 2009 049 602.5 which, however, is not a prior publication.

When vehicle bodies are mass produced, a plurality of individual body parts and add-on parts, such as mounting brackets, etc., are assembled in a largely fully automated manner. During a joining operation, two or more vehicle body parts are first positioned relative to each other by means of a time-consuming and costly chucking and receiving technique, and then subsequently connected to each other, for example, by welding, clinching or other joining methods.

In the aforementioned DE 10 2009 049 602.5, the aim is to loosely prefix two components that are to be securely connected to each other. The one component consists of a protruding positive locking element in the form of a sphere; and this first positive locking element engages with a recess of the second component. The recess is designed, for example, in the manner of a key hole. Thus, the two components that are to be connected to each other are assembled and then displaced relative to each other, so that the result of the displacement is a positive locking. Owing to the positive locking, the two components are prefixed relative to each other and then can be securely connected to each other, for example, by welding.

The object of the present invention is to provide a component connection concept, which allows components, in particular body parts of vehicles and add-on parts and/or non-vehicle components, to be easily (pre-)assembled.

This and other objects are achieved by a component connection and a method of forming same, including a first vehicle component having a male fixing element protruding from the first vehicle component which has partially or completely the shape of a sphere or has partially or completely a shape similar to a sphere, and a second vehicle component having a female fixing element provided for receiving the male fixing element, the male fixing element being inserted into the female fixing element in one direction of insertion. The male fixing element has an interference in relation to the female fixing element substantially in essence transversely to the direction of insertion, so that the two vehicle components are clamped to each other at the fixing elements.

The starting point of the invention is a method for connecting components, wherein a first vehicle component or, respectively, a first non-vehicle component is connected to a second vehicle component or, respectively, a second non-vehicle component.

The term "connection component" includes both "vehicle components" and "non-vehicle components."

The term "vehicle component" is to be construed in the broadest sense. It includes a plurality of types of components that are to be connected during the manufacture of a vehicle, in particular, but not exclusively, components of a vehicle body, but also other components, such as so-called "add-on components" of vehicles (retaining devices for auxiliary units, etc.). The term "vehicles" includes both passenger vehicles and commercial vehicles, such as tractor trailers, rail vehicles, motorcycles, etc.

The term "non-vehicle component" is also used in the broadest sense. It basically includes all kinds of components, which are intended for use outside the vehicle (production) sector, in particular outside the road vehicle (production) sector. The invention can be used, for example, in the following sectors:

(A) The "white goods" sector, i.e. the production of household appliances, such as refrigerators, upright freezers, chest freezers, electric ranges, washing machines, dishwashers, clothes dryers etc., in particular the connection of (sheet metal) housing components intended for household appliances.

1. Housing parts can be fitted together, not only for prefixing, but also "the sphere" can be used specifically as a joining element that enables a subsequent disassembly.
2. A sphere as a standardized element for assembly parts, for example, insulating materials, covering parts, electronics/control devices, cables, etc.
3. For example, the component connection according to the invention can be used in a refrigerator or a dryer as a floating clamping element for heat exchangers or the like.

(B) Furniture production, in particular the connection of individual furniture parts. The invention could be used, for example, in the production of 1. house and kitchen furniture, office furniture, laboratory furniture, street furniture, urban furniture, park furniture, garden furniture, for example, for positioning and prefixing structural and assembly parts;
2. sheet metal components for prefixing components, in order to subsequently fix them with few joining elements (for example, screws); and
3. for geometric alignment of several furniture parts by way of the sphere (a second component/piece of furniture "slides" over the sphere into the correct position relative to a first component/piece of furniture).

(C) Construction industry, in particular the connection of individual components of a house, such as the connection of facade elements, fastening systems, anchoring systems in the structural area under construction, for example, roof structures or exhibition trade show booths that can be disassembled.

(D) Aircraft construction, in particular airplane construction, and further in particular the connection of components of aircrafts.

(E) Toy sector, in particular the connection of individual toy parts. The above list of possible applications of the invention is purely illustrative and is not intended to be limiting in any way.

Even though the following description focuses primarily on "vehicle components," it is explicitly to be noted that all aspects of the invention can also be applied to the field of "non-vehicle components." In particular, aspects of the invention, which relate to a method for connecting vehicle components, can also be used in the method relating to "non-vehicle components."

The first of two vehicle components or, respectively, the first of two non-vehicle components has a "male fixing element," protruding from the first vehicle component or, respectively, from the first non-vehicle component; and this male fixing element has partially or completely the shape of a sphere or, respectively, a spherical cap or which partially or completely has a shape similar to a sphere. The term "similar to a sphere" is also to be construed in the broadest sense and is not limited to the mathematical concept of spherical geometry. "Similar to a sphere" may mean, for example, that the shape is "convex curved." Preferably, the male fixing element that has the shape of a sphere or a shape similar to a sphere is rotationally symmetrical with respect to the direction of a normal line of one or both vehicle component(s) at the location of the male fixing element. The terms "spherical" or "similar to a sphere" comprises, as a general rule, "round" or "curved," in particular "convex curved" geometries. A male fixing element that is designed in such a way can be very easily assembled with the second vehicle component or, respectively, the second non-vehicle component. The round, edgeless geometry of the male fixing element minimizes the potential risk of an unintentional tilting of the two vehicle components or, respectively, the non-vehicle components when they are fitted together.

The second vehicle component or, respectively, the second non-vehicle component has a "female fixing element" that is provided for receiving the male fixing element. The term "female fixing element" is also to be construed in the broadest sense. As a general rule, it is defined very loosely as design configurations that enable the male fixing element to be inserted into the female fixing element in one direction of insertion.

According to an aspect of the invention, the male fixing element is slightly oversized in relation to the female fixing element to produce an interference fit. The interference fit can exist, in particular, in a direction that is transverse to the direction of insertion. When the two vehicle components or, respectively, the two non-vehicle components are fitted together, this interference makes it possible to clamp said vehicle components or, respectively, non-vehicle components together at the fixing element in such a way that they can be detached.

Therefore, the vehicle components or, respectively, the non-vehicle components can be easily fitted together and in this way (pre)fixed relative to each other.

Vehicle components, such as individual vehicle body parts, or, respectively, non-vehicle components, can be connected to each other by one or more such component connections, i.e. can be pre(assembled). In this context the individual components only have to be "fitted together." Depending on the type of vehicle component or, respectively, non-vehicle component, and the structurally intended "clamping force," the two vehicle components or, respectively, non-vehicle components can be connected to each other solely by means of the component connection according to the invention or, in addition, by means of one or more other joining techniques, such as welding, screwing, riveting, clinching, etc. Particular consideration is also given to such joining techniques that can be produced by way of a single component ("unilateral joining technique"). Some examples that can be named here include laser welding. In this case it is not absolutely mandatory, in contrast to spot welding operations, that the "component composite" has to be accessible from both sides using a welding gun, but rather it is possible to work from a single side.

Positive locking in the direction of insertion can be provided between the fixing elements. However, it is not absolutely necessary that such a positive locking be provided. In other words, it is not absolutely mandatory that an undercut of the male and female fixing element be provided.

The female fixing element can be formed by a "passage hole," which is provided in the second vehicle component or, respectively, in the second non-vehicle component. The term "passage hole" is to be construed very loosely and is not limited per se to a specific hole geometry. The passage hole can have, for example, the shape of a circle or can have a geometry that deviates from the shape of a circle, such as an essentially quadratic geometry, a triangular, rectangular or polygonal geometry, where the "corners" can be rounded off.

Since the male fixing element has transversely to the direction of insertion a defined interference with respect to the female fixing element, the two fixing elements (or at least one of the two fixing elements) have to have a defined "minimum elasticity," so that it is possible to fit them together and so that an adequate clamping force is maintained after assembly.

The male fixing element may be, for example, a sphere made of a solid material, in particular a steel or aluminum sphere. As an alternative, the male fixing element can also be made of any other material, such as a synthetic plastic material. Such a "solid sphere" has a comparatively low elasticity. Then, the minimum elasticity that is necessary for assembly can be achieved with a suitable design configuration of the female fixing element.

It can be provided that after the two vehicle components or, respectively, non-vehicle components have been fitted together, they can be connected to each other with zero play, i.e. are fixed in such a manner that they cannot be displaced relative to each other, at the fixing elements in directions that are transverse to the direction of insertion.

As stated above, the two vehicle components or, respectively, non-vehicle components, can be (pre)fixed to each other by use of a plurality of such or similar component connections. Correspondingly, one of the two vehicle components or, respectively, non-vehicle components, can have at least one additional male fixing element that also has partially or completely the shape of a sphere or partially or completely a shape similar to a sphere and can be inserted or is inserted into a complementary additional female fixing element, which is provided on the other vehicle component or, respectively, non-vehicle component concerned, in one or in the same direction of insertion as the first male fixing element.

The at least one additional female fixing element can be formed by a slot or by an oblong passage hole, in which the additional male fixing element can be displaced in a longitudinal direction of the slot or the oblong passage hole.

Therefore, figuratively speaking, the one "component connection" forms a "fixed bearing"; and the at least one additional component connection forms a "floating bearing." This feature has the advantage that the two vehicle components that are to be connected to each other can be fitted together or fixed to each other in such a way that they "float" and, as a result, are essentially free of stress.

According to a further aspect of the invention, one edge of the passage hole forming the female fixing element has at least one flexible clamping element that projects from the second vehicle component or, respectively, second non-vehicle component. The clamping element exerts from the outside a clamping force, which acts more or less transversely to the direction of insertion, on an exterior of the male fixing element. The clamping element can reach behind the male fixing element. However, this does not have to be necessarily the case. In the event that there is an undercut, the result is an "over-pushing" when joining together, i.e. fitting together the two fixing element; and, thus, the result is an audible latching of the male fixing element in or at the female fixing element.

The clamping element may be a clamping collar that extends along the entire edge of the passage hole. As an alternative, it is possible to provide only one clamping collar element that extends over a circumferential section. Furthermore, a plurality of clamping collars, which are spaced apart from each other in the circumferential direction, can be provided along the passage hole; and these clamping collars make contact from the outside with the male fixing element on a circumferential section or, respectively, at a point on the periphery. It can also be provided that only one portion of the provided clamping collars pushes from the outside against the male fixing element.

It can be provided that the clamping collar(s) projects (project) from the second vehicle component in the direction of insertion or against the direction of insertion. The at least one clamping collar does not have to be bent completely perpendicular in relation to the second vehicle component, but rather can be positioned in a slightly inclined manner. For example, it can be provided that the at least one clamping collar encloses with the surface of the second vehicle component or, respectively, second non-vehicle component, in an area of the passage hole an angle in the range that lies in the range between 80° and 90°.

The first and/or the second vehicle component or, respectively, non-vehicle component, may be a sheet metal component. In the case of vehicle components the first and/or the second vehicle component may be, in particular, a component of a vehicle body. The passage hole, forming the female fixing element, may be stamped out of the second vehicle component or, respectively, non-vehicle component. The clamping collar may be a "bent over" or "upright positioned" section of the punched passage hole.

One or both of the vehicle components or, respectively, non-vehicle components, may be, in particular, deep drawn parts. The at least one female fixing element, which is formed, for example, by a passage hole, may be punched directly in the deep drawing tool or may be produced in a subsequent production step.

One or both of the vehicle components or, respectively, non-vehicle components, may be components made of metal (sheet metal component(s)) or made of a synthetic plastic material, in particular made of a fiber-reinforced plastic (for example, carbon fiber component(s), glass fiber component(s) or the like).

In summary it must be pointed out that the invention makes possible significant cost savings in the automotive engineering sector that is already highly automated at the present time. However, in sectors outside vehicle manufacturing or in sectors in which automation has appeared to be too expensive to date, the invention offers the possibility of redesigning and automating from the ground up those production processes that have not been automated or have been barely automated in the past, so that the result would be a high cost saving potential. Therefore, the method according to the invention can be established in a number of sectors as a very economical "standard connection method" that is independent of a specific geometry or device.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 1 shows a metal plate with a steel sphere welded thereto.

FIGS. 2 and 3 show, in each instance, a metal plate with a passage hole with a clamping collar around the periphery thereof.

FIGS. 4 to 6 show a number of exemplary embodiments with a variety of clamping collars.

DETAILED DESCRIPTION OF THE DRAWINGS

Figure 7:
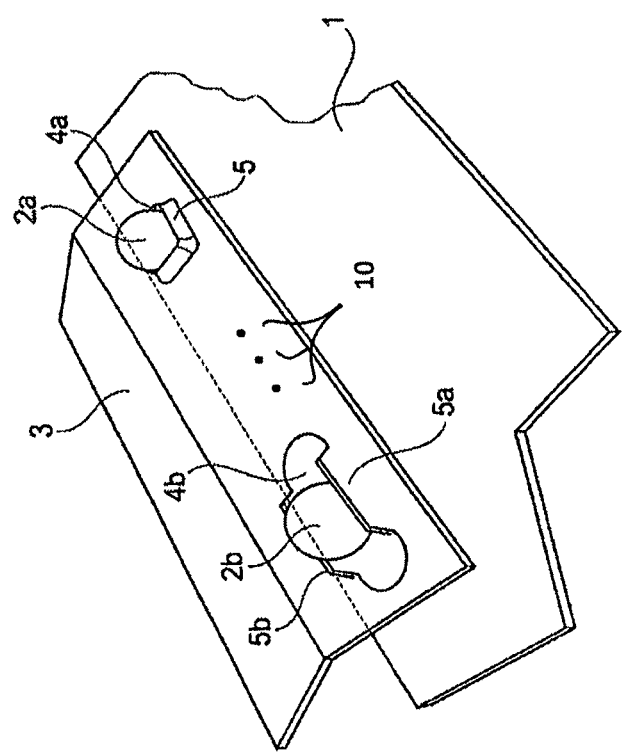
FIG. 7 shows two exemplary inventive components that are fixed to each other in a floating manner.

FIG. 1 shows a first metal plate 1, onto which a steel sphere 2 is welded.

FIGS. 2 and 3 show, in each instance, a second metal plate 3, into which a passage hole 4 is punched. This passage hole 4 has a curved collar 5, which acts as a clamping collar. The passage hole 4 and/or the clamping collar 5 has (have) a slightly smaller diameter than the sphere 2. However, the clamping collar 5 is sufficiently elastic that the sphere can be inserted into the passage hole 4.

The passage hole 4 can have, as shown in FIGS. 2 and 3, an approximately rectangular or square shape. In the case of an approximately square passage hole geometry, the clamping collar 5 pushes against the sphere 2 from the outside in the form of a point at four locations that are spaced approximately 90° apart from each other (see FIG. 4).

FIG. 4 shows the two metal plates 1, 3 in the assembled state. The sphere 2 that is fixed on the metal plate 1 was pushed through the passage hole 4 from the bottom. The clamping collar 5 pushes against the sphere 2 from the outside more or less transversely to one direction of insertion 6. As a result, the two metal plates 1, 3 are securely positioned relative to each other in essence without play in directions that are transverse to the direction of insertion 6.

FIG. 5 shows an exemplary embodiment having, instead of a peripheral clamping collar, a plurality of clamping collar elements 5a, 5b, 5c that resemble teeth and that are uniformly distributed around the periphery.

The exemplary embodiment, shown in FIG. 6, has only two such clamping collar elements 5a, 5b that resemble teeth and that are spaced approximately 180° apart from each other along the periphery. The two clamping collar elements 5a, 5b are arranged on mutually opposite sides of the sphere 2.

FIG. 7 shows an exemplary embodiment, in which a first sphere 2a and a second sphere 2b are arranged on a first metal plate 1 in such a way that they are spaced apart from each other. The two spheres 2a, 2b can be welded onto the metal plate 1.

The second metal plate 3 has a first rectangular or square passage hole 4a, which corresponds to the sphere 2a and which has a peripheral clamping collar 5, which is similar to the one shown in FIGS. 2 to 4. As a result, the two metal plates 1, 3 are securely fixed relative to each other transversely to the direction of insertion in the areas of the sphere 2a.

In contrast, the second passage hole 4b is an oblong passage hole with two clamping collars 5a, 5b, which extend in the longitudinal direction of the hole and which push against the outside of the sphere 2b from the direction of the mutually opposing sides. In the arrangement shown in FIG. 7, the metal plates are fixed to each other in a "floating" manner. Owing to the oblong hole 4b, tension between the attachment points is avoided.

The two metal plates 1, 3 can be easily fitted together and then subsequently permanently and securely connected to each other, for example, by an additional connection by welding (see welds 10). The thermal expansion that occurs during the welding operation is "automatically" compensated due to the floating arrangement of both metal plates.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A component connection, comprising:
a first vehicle connection component having a male fixing element protruding from a major surface of the first vehicle connection component, the male fixing element having a partial or complete sphere shape;
a second vehicle connection component having a female fixing element formed as a passage hole in a major surface of the second vehicle connection component, the passage hole operatively configured to receive the male fixing element, the male fixing element being insertable into and through the passage hole in one insertion direction;
wherein the male fixing element has an oversized dimension in relation to the passage hole substantially transverse to the one insertion direction such that the major surfaces of the first and second vehicle connection components abut one another and are clamped together at the fixing elements; and
wherein the second vehicle connection component comprises at least one preformed flexible clamping element projecting, before the first and second vehicle connection components are clamped together, out of the major surface at an edge of the passage hole, the flexible clamping element exerting, after the first and second vehicle connections components are clamped together, a clamping force exteriorly onto an exterior of the male fixing element, which clamping force acts substantially transverse to the one insertion direction.

2. The component connection according to claim 1, wherein the passage hole has a non-circular shape.

3. The component connection according to claim 1, wherein the passage hole comprises one of a square and a triangular shape.

4. The component connection according to claim 1, wherein the first and second vehicle components are fixed in an area of the male and female fixing elements such that the first and second vehicle components are not displaceable relative to one another in directions transverse to the insertion direction.

5. The component connection according to claim 1, further comprising:
an additional male fixing element having a partial or complete sphere shape provided on the first vehicle connection component; and
a complementary additional female fixing element provided on the second vehicle connection component, the additional male fixing element being insertable into the complementary additional female fixing element in the one insertion direction.

6. The component connection according to claim 5, wherein the complementary additional female fixing element comprises one of a slot and an oblong passage hole, in which the additional male fixing element is displaceable in a longitudinal direction of the slot or the oblong passage hole.

7. The component connection according to claim 1, wherein the clamping element reaches behind the male fixing element.

8. The component connection according to claim 1, wherein the clamping element is a clamping collar extending along substantially an entire edge of the passage hole.

9. The component connection according to claim 1, wherein the clamping element comprises a plurality of clamping collars uniformly spaced apart from each other along a peripheral direction about an edge of the passage hole, the plurality of clamping collars exteriorly contacting the exterior of the male fixing element about a periphery thereof.

10. The component connection according to claim 1, wherein the clamping element comprises one or more clamping collars, said one or more clamping collars projecting from the major surface of the second vehicle component in or opposite the insertion direction.

11. The component connection according to claim 1, wherein at least one of the first and second vehicle components is a sheet metal component.

12. The component connection according to claim 1, wherein at least one of the first and second vehicle components is a vehicle body component.

13. The component connection according to claim 1, wherein the passage hole is a punched passage hole in the second vehicle component.

14. The component connection according to claim 1, wherein the clamping element comprises one or more clamping collars, said clamping collars being a bent section of the second vehicle component.

15. The component connection according to claim 1, wherein the male fixing element comprises only metal.

16. The component connection according to claim 1, further comprising a weld connecting the male fixing element to the first vehicle component.

17. The component connection according to claim 1, wherein a pre-fixed connection is formed by the first and second vehicle components being securely clamped together; and further comprising an additional, laser weld joint connection securely connecting the first and second vehicle components directly to one another.

18. A method for detachably preassembling at least two vehicle components, the method comprising the acts of:
providing a first vehicle component having a male fixing element projecting from a major surface of the first vehicle component and having a partial or complete sphere shape;
providing a second vehicle component having a female fixing element formed as a passage hole in a major surface of the second vehicle component, and having at least one preformed flexible clamping element that projects out of the major surface of the second vehicle component and is located at an edge of the passage hole;
fitting together the first and second vehicle components via a clamping connection formed by inserting, in one insertion direction, the male fixing element into and through the female fixing element with an interference between the sphere shape and the passage hole, wherein the flexible clamping element exerts, in a securely clamped condition of the first and second vehicle components, a clamping force acting exteriorly onto the male fixing element in a substantially transverse direction relative to the one insertion direction, and the major surfaces of the first and second vehicle components about one another in the securely clamped condition.

\* \* \* \* \*